United States Patent
P et al.

(10) Patent No.: US 10,091,606 B2
(45) Date of Patent: Oct. 2, 2018

(54) SYSTEM AND METHOD OF ENROLLING SENSORS WITH A CONTROL PANEL USING A MOBILE DEVICE

(71) Applicant: Honeywell International Inc., Morristown, NJ (US)

(72) Inventors: Uday Krishna P, Visakhapatnam (IN); Gopi Krishna Ratnakaram, Chirala (IN); Shanmuga Prabhu M, Kumbakonam (IN); Samidurai Krishnamoorthy, Thanjavur (IN); Balamurugan Ganesan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 48 days.

(21) Appl. No.: 14/944,402

(22) Filed: Nov. 18, 2015

(65) Prior Publication Data
US 2017/0142541 A1 May 18, 2017

(51) Int. Cl.
| | |
|---|---|
| *H04B 7/00* | (2006.01) |
| *H04W 4/00* | (2018.01) |
| *H04L 12/24* | (2006.01) |
| *H04Q 9/00* | (2006.01) |
| *H04W 4/80* | (2018.01) |
| *H04W 84/18* | (2009.01) |

(52) U.S. Cl.
CPC ......... *H04W 4/008* (2013.01); *H04L 41/0806* (2013.01); *H04L 41/0883* (2013.01); *H04L 41/22* (2013.01); *H04Q 9/00* (2013.01); *H04W 4/80* (2018.02); *H04Q 2209/43* (2013.01); *H04Q 2209/47* (2013.01); *H04Q 2209/86* (2013.01); *H04W 84/18* (2013.01)

(58) Field of Classification Search
CPC .. H04W 4/008; H04W 84/18; H04L 41/0806; H04L 41/0883; H04L 41/22
See application file for complete search history.

(56) References Cited

U.S. PATENT DOCUMENTS

| | | | | |
|---|---|---|---|---|
| 5,969,582 A | * | 10/1999 | Boesch | H03F 1/56 333/129 |
| 7,869,824 B2 | * | 1/2011 | Min | G08C 17/02 455/418 |
| 8,461,931 B1 | * | 6/2013 | Bayruns | H03F 1/0244 330/127 |

(Continued)

OTHER PUBLICATIONS

Extended European search report from corresponding EP patent application 16196672.6, dated Mar. 29, 2017.

*Primary Examiner* — Edward Urban
*Assistant Examiner* — Max Mathew
(74) *Attorney, Agent, or Firm* — Husch Blackwell LLP

(57) ABSTRACT

Systems and methods of enrolling sensor devices with a control panel device using a mobile device are provided. Some methods can include detecting signals received from sensor devices, identifying a signal strength of each of the signals, displaying a list of each of the sensor devices and the signal strength of respective signals received from respective ones of the sensor devices, receiving user input to select at least one of the sensor devices, and transmitting an identifying signal to a control panel device to enroll the at least one sensor device with the control panel device for configuration thereof.

18 Claims, 4 Drawing Sheets

(56) References Cited

U.S. PATENT DOCUMENTS

| | | | |
|---|---|---|---|
| 8,688,039 B2* | 4/2014 | Ahn | H04W 8/005 |
| | | | 455/41.2 |
| 8,836,467 B1* | 9/2014 | Cohn | G08B 25/003 |
| | | | 340/3.32 |
| 2001/0031637 A1* | 10/2001 | Suzuki | H04L 63/126 |
| | | | 455/435.1 |
| 2007/0042725 A1* | 2/2007 | Poilasne | H04B 1/1027 |
| | | | 455/101 |
| 2007/0063833 A1* | 3/2007 | Kates | G08B 25/009 |
| | | | 340/521 |
| 2008/0094142 A1* | 4/2008 | Kawashima | H03F 3/189 |
| | | | 330/296 |
| 2008/0242220 A1* | 10/2008 | Wilson | H04M 1/7253 |
| | | | 455/3.04 |
| 2010/0090767 A1* | 4/2010 | Ohnishi | H03F 1/0272 |
| | | | 330/277 |
| 2011/0003566 A1* | 1/2011 | Makihara | H01Q 23/00 |
| | | | 455/127.1 |
| 2011/0095882 A1 | 4/2011 | Bell | |
| 2012/0092076 A1* | 4/2012 | Kamgaing | H01P 1/212 |
| | | | 330/302 |
| 2013/0324058 A1* | 12/2013 | Yoon | H04B 5/0062 |
| | | | 455/83 |
| 2014/0049273 A1* | 2/2014 | Rocznik | G01R 27/2605 |
| | | | 324/679 |
| 2015/0035607 A1* | 2/2015 | Takenaka | H03F 3/21 |
| | | | 330/297 |
| 2015/0351008 A1* | 12/2015 | Mayor | H04W 48/16 |
| | | | 455/41.2 |

* cited by examiner

SYSTEM AND METHOD OF ENROLLING SENSORS WITH A CONTROL PANEL USING A MOBILE DEVICE

FIELD

The present invention relates generally to enrolling sensors with a control panel. More particularly, the present invention relates to systems and methods of enrolling sensors with a control panel using a mobile device.

BACKGROUND

It is known that sensor devices that are installed in a monitored region must be enrolled with a control panel device so that the control panel device can configure the sensor devices for operation therewith. However, sensor devices are generally installed in a monitored region before the control panel device is configured. Furthermore, because sensor devices may be installed in various locations and at different heights, it may be difficult to reach installed sensor devices for configuration with the control panel devices.

Various systems and methods have been developed to configure sensor devices, including directly entering the serial number of a sensor device into a control panel device, scanning an RFID tag on a sensor device using a scanner, and a control panel device automatically scanning for sensor devices. However, each of these known systems and methods presents various disadvantages, including, but not limited to, being time consuming, being difficult and uncomfortable to implement, and requiring specific addresses or numbers for each sensor device.

In view of the above, there is a continuing, ongoing need for improved systems and methods.

DETAILED DESCRIPTION

Figure 1:
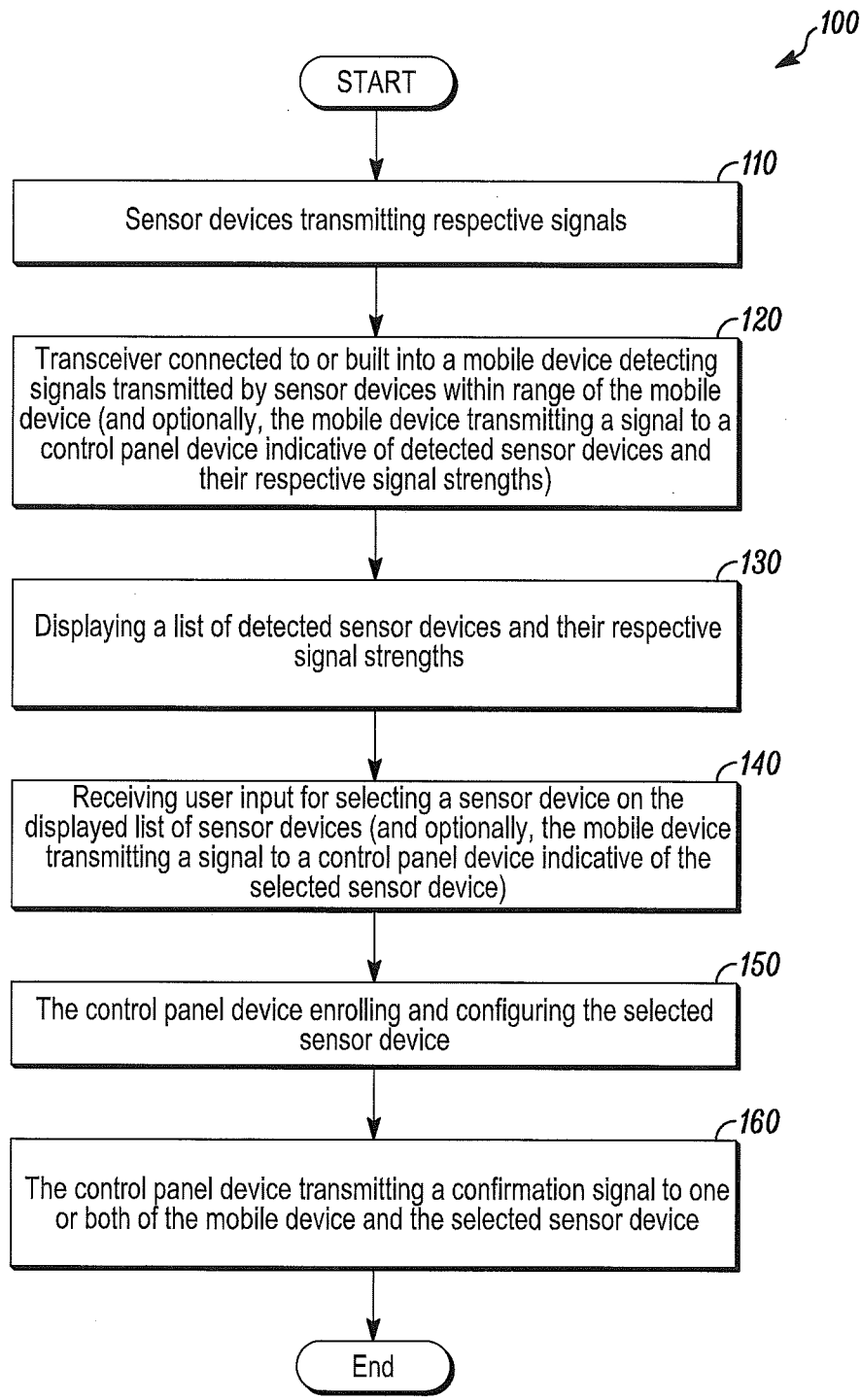
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of enrolling sensor devices with a control panel device using a mobile device. It is to be understood that systems and methods disclosed herein can be used in connection with any kind of wireless sensor device as known by one of skill in the art, including, but not limited to, RF-based sensor devices, Bluetooth-based sensor devices, Wi-Fi-based sensor devices, Z-wave-based sensor devices, ZigBee-based sensor devices, and the like.

In accordance with disclosed embodiments, a mobile device, such as a user's cellular phone or personal digital assistant, can communicate with a plurality of sensor devices installed in a monitored region and within range of the mobile device. For example, in some embodiments, a portable wireless transceiver can be connected to the mobile device, for example, via a USB port or headphone jack on the mobile device, for communicating with sensor devices via an RF signal. Additionally or alternatively, in some embodiments, the mobile device can communicate with sensor devices via a built-in transceiver, such as a Bluetooth transceiver or a Wi-Fi transceiver, and a signal that is supported by the transceiver, such as a Bluetooth signal or a Wi-Fi signal.

The mobile device can execute a software application running therein or thereon. For example, the software application can instruct the built-in or external transceiver of the mobile device to detect signals transmitted by sensor devices within range of the mobile device. Responsive thereto, the mobile device can identify a signal strength of each of the detected signals and can display a list of detected sensor devices as well as their respective signal strengths. For example, sensor devices that are a short distance away from the mobile device will have a higher signal strength than sensor devices that are a farther distance away from the mobile device. In some embodiments, the mobile device can display the list of detected sensor devices by the name or type of a respective sensor device.

A user can view the list of sensor devices and signal strengths displayed on the mobile device and provide user input to the mobile device for selecting a sensor device and enrolling the selected sensor device with an associated control panel device. For example, in some embodiments, the mobile device can communicate a signal to the control panel device indicative of selected sensor devices.

In some embodiments, the mobile device, the software application running therein or thereon, or a user of the mobile device can instruct the mobile device or software application to display only a user-selected type of sensor device, for example, a smoke sensor device, a motion sensor device, or the like. In these embodiments, the transceiver of the mobile device can detect signals by all sensor devices within range of the mobile device, and the mobile device or the software application running therein or thereon can identify the type of sensor device from which a respective signal originated. A user can provide user input to the mobile device indicative of one or more types of sensor devices the user intends to configure, and responsive thereto, the mobile device or the software application running therein or thereon can display on the mobile device a list of detected sensor devices and their respective signal strengths that includes only sensor devices that are the type identified by the user.

In some embodiments, responsive to transceiver of the mobile device detecting signals transmitted by sensor devices within range of the mobile device, the mobile device can communicate a signal to the control panel device indicative of the detected sensor devices. In these embodiments, the control panel device can display the list of detected sensor devices as well as their respective signal strengths, and a user can provide user input directly to the control panel device for selecting a sensor device and enrolling the selected sensor device with the control panel device.

In any embodiment, the control panel device can enroll a selected sensor device for configuration thereof. Then, the control panel device can transmit a signal to one or both of the mobile device and the selected sensor device indicative of an enrollment confirmation or a configuration confirmation.

Benefits and advantages of the systems and methods disclosed herein include, but are not limited to, being comfortable to a user, being easy to install, requiring less installation time, being easy to troubleshoot, for example, when a faulty sensor device exists, and facilitating the avoidance of conflicts between nearby sensor devices.

FIG. 1 is a flow diagram of a method 100 in accordance with disclosed embodiments. As seen in FIG. 1, the method 100 can include a plurality of sensor devices installed in a monitored region transmitting respective signals as in 110. For example, in some embodiments, each sensor device in the plurality can transmit a signal identifying a name, type, serial number, or location of the sensor device.

The method 100 can also include a transceiver built into or connected to a mobile device detecting signals transmitted by the sensor devices within range of the mobile device as in 120. Detecting the signals as in 120 can also include identifying a signal strength thereof. Responsive to detecting the signals as in 120, the method can include displaying a list of detected sensor devices as well as their respective signal strengths as in 130. For example, in some embodiments, the mobile device can display the list of detected sensor devices, and in some embodiments, a control panel device can display the list of detected sensor devices. In embodiments that include the control panel device displaying the list of detected sensor devices as in 130, the method 100 can include the mobile device transmitting a signal to the control panel device indicative of the detected sensor devices and their respective signal strengths as in 120.

As seen in FIG. 1, the method 100 can include receiving user input for selecting a sensor device on the displayed list of sensor devices as in 140. For example, in some embodiments, the mobile device can receive the user input, and in some embodiments, the control panel device can receive the user input. In embodiments in which the mobile device receives the user input as in 140, the method 100 can include the mobile device transmitting a signal to the control panel device indicative of the selected sensor device as in 140.

Regardless of the embodiment, after the control panel device is notified of a selected sensor device, the method 100 can include the control panel device enrolling and configuring the selected sensor device as in 150. Responsive thereto, the method 100 can also include the control panel device transmitting a confirmation signal to one or both of the mobile device and the selected sensor device as in 160.

Figure 2:
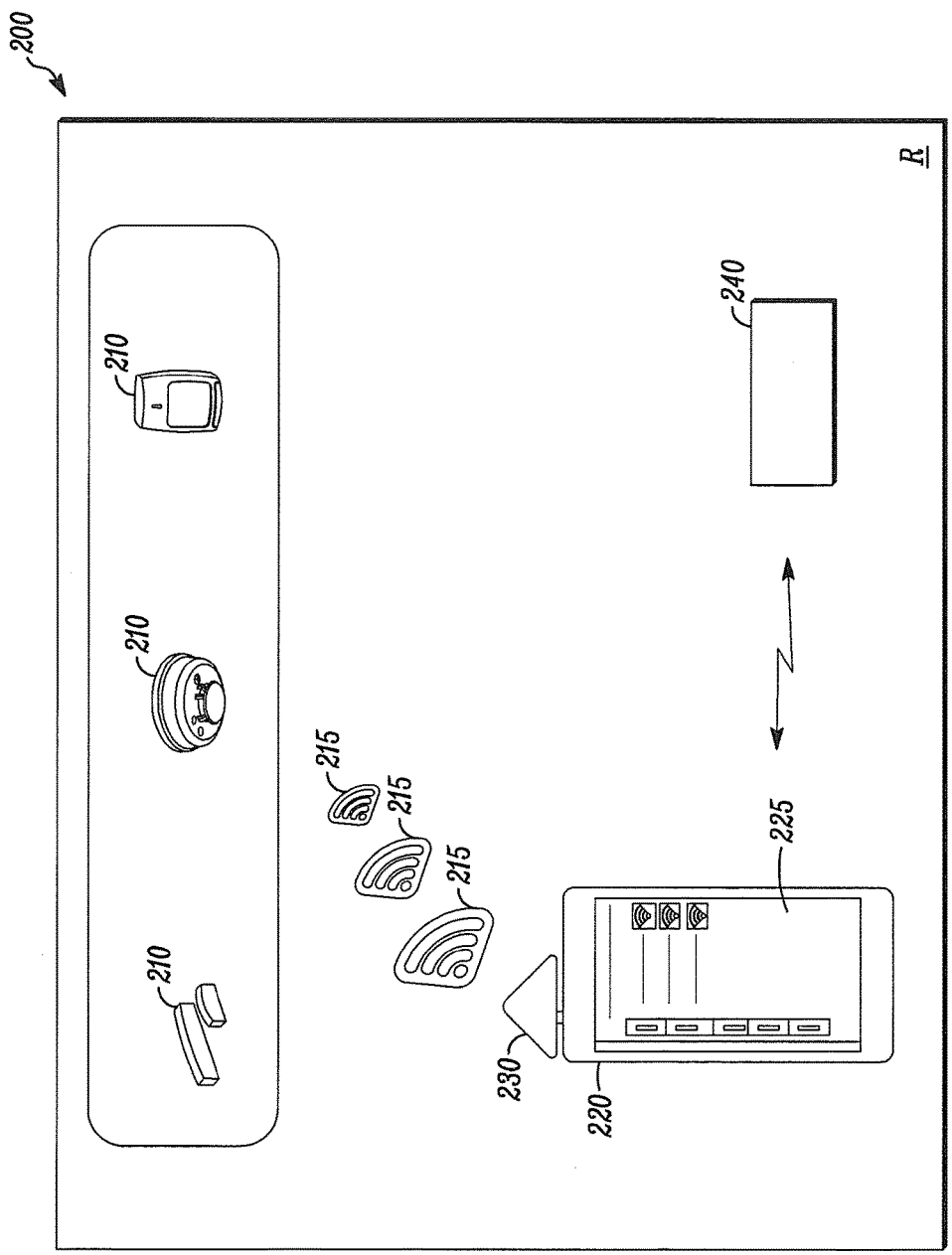
FIG. 2 is a block diagram of a system in accordance with disclosed embodiments.

FIG. 2 is a block diagram of a system 200 in accordance with disclosed embodiments. As seen in FIG. 2, the system 200 can include a plurality of RF sensor devices 210 installed in a monitored region R and a mobile device 220 in the monitored region R. Each of the sensor devices can transmit an RF signal 215, and an RF transceiver device 230 connected to the mobile device 220 can detect one or more of the signals 215 originating from one or more of the sensor devices 210 within range of the transceiver device 230.

The mobile device 220 can execute a software application running thereon or therein, which can process the received signals 215, identify respective signal strengths of the received signals 215, and display, on a user interface device 225 of the mobile device 220, a list of the sensor devices 210 that originated the received signals 215 and the respective signal strengths thereof. The user interface device 225 can receive user input selecting one or more the of the listed sensor devices 210, and responsive thereto, the mobile device 220 can transmit a signal to an associated control panel device 240 indicative of the selected sensor devices 210 for enrollment therewith and configuration thereof. In some embodiments, the mobile device 220 can communicate with the control panel device 240 via the transceiver device 230 or via an alternate transceiver device.

Additionally or alternatively, the mobile device 220 can transmit a signal to the control panel device 240 indicative of the list of sensor devices 210 and the respective signal strengths thereof. Responsive thereto, the control panel device 240 can display the list of sensor devices 210 and the respective signal strengths thereof and receive user input selecting one or more of the listed sensor devices 210. Responsive to the user input, the control panel device 240 can enroll and configure the selected sensor devices 210.

Figure 3:
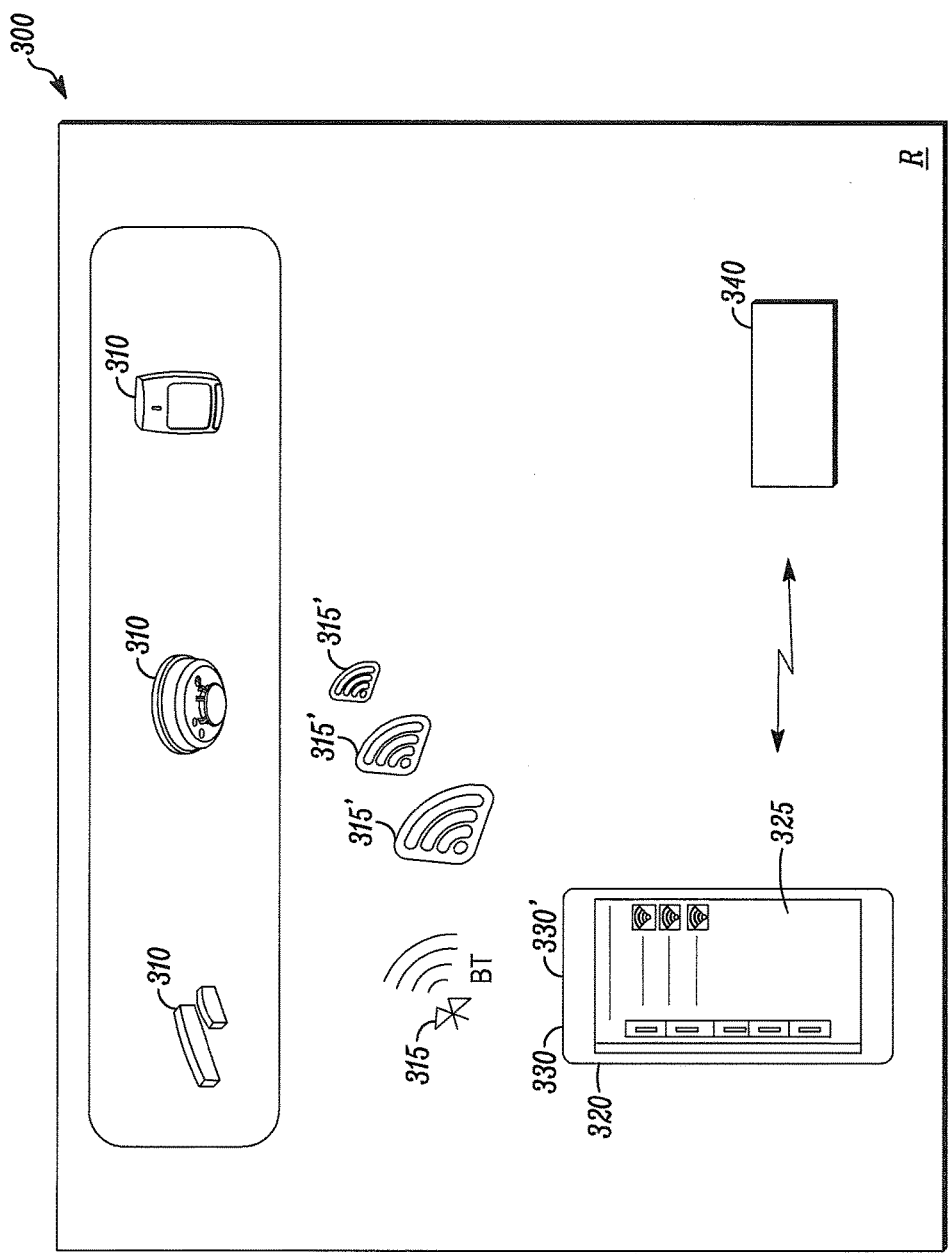
FIG. 3 is a block diagram of a system in accordance with disclosed embodiments.

FIG. 3 is a block diagram of a system 300 in accordance with disclosed embodiments. The system 300 is substantially identical to the system 200 except that each of the plurality of sensor devices 310 is a Bluetooth sensor device or a Wi-Fi sensor device. Accordingly, each of the sensor devices 310 can transmit a Bluetooth signal 315 or a Wi-Fi signal 315', and a Bluetooth transceiver device 330 or Wi-Fi transceiver device 330' built into the mobile device 320 can detect one or more signals 315, 315' originating from one or more of the sensor devices 310 within range of the transceiver device 330. The mobile device 320 can communicate with a control panel device 340 via one or both of the Bluetooth transceiver device 330 and the Wi-Fi transceiver device 330' or via an alternate transceiver device.

It is to be understood that the system 300 and the system 400 can operate simultaneously or separately. For example, in some embodiments, a mobile device can include one or more of an RF transceiver device connected to the mobile device, a Bluetooth transceiver device built into the mobile device, and a Wi-Fi transceiver device built into the mobile device. In these embodiments, the mobile device can receive signals from an RF sensor device, a Bluetooth sensor device, and a Wi-Fi sensor device substantially simultaneously and display a list that includes each of the RF sensor device, the Bluetooth sensor device, and the Wi-Fi sensor device and their respective signal strengths.

Figure 4:
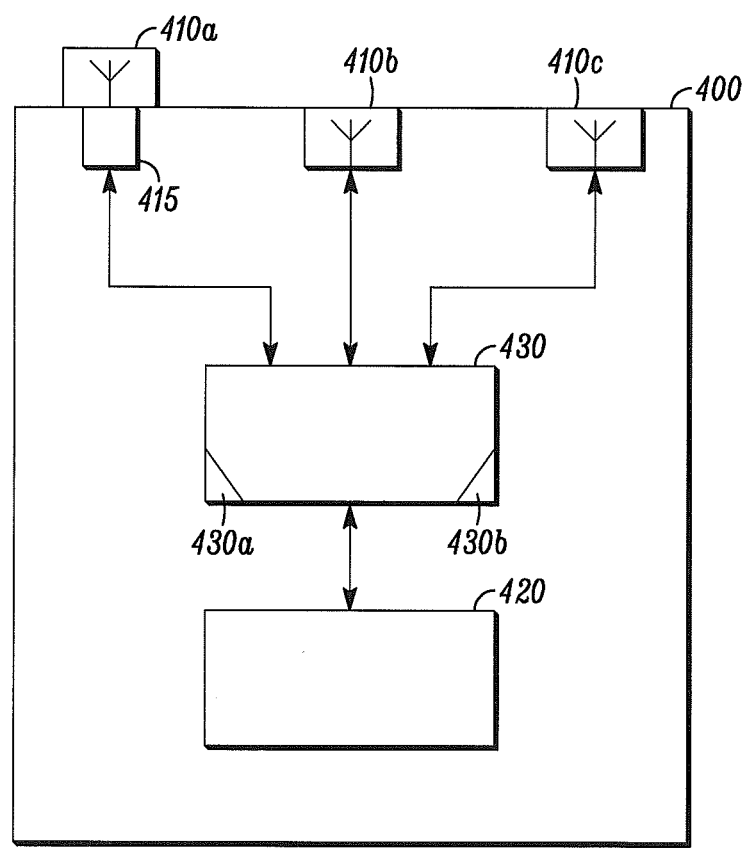
FIG. 4 is a block diagram of a mobile device 400 in accordance with disclosed embodiments.

FIG. 4 is a block diagram of a mobile device 400 in accordance with disclosed embodiments. As seen in FIG. 4, the mobile device 400 can include at least one of an RF transceiver device 410a connected to a port or jack 415 of the mobile device 400, a Bluetooth transceiver device 410b built into the mobile device 400, and a Wi-Fi transceiver device 410c built into the mobile device 400. The mobile device 100 can also include a user interface device 420, control circuitry 430, one or more programmable processors 430a, and executable control software 430b as would be understood by one of ordinary skill in the art. The executable control software 430b can be stored on a transitory or non-transitory computer readable medium, including, but not limited to, local computer memory, RAM, optical storage media, magnetic storage media, flash memory, and the like. In some embodiments, the control circuitry 430, programmable processor 430a, and control software 430b can execute and control the methods described above and herein.

For example, the control circuitry 430, programmable processor 430a, and control software 430b can instruct one or more of the transceiver devices 410a, 410b, 410c to receive, detect, or identify signals transmitted by sensor devices within range of the mobile device 400. Responsive to detecting the signals, the control circuitry 430, programmable processor 430a, and control software 430b can identify a respective signal strength of the detected signals and cause a list of detected sensor devices as well as their respective signal strengths to be displayed on the user interface device 420 or can instruct one or more of the transceiver devices 410a, 410b, 410c or an alternate transceiver device to transmit a signal to a control panel device for displaying the list of detected sensor devices as well as their respective signal strengths. When the user interface device 420 displays the list, the user interface device 420 can receive user input to select a sensor device, and responsive thereto, the control circuitry 430, programmable processor 430*a*, and control software 430*b* can transmit a signal to the control panel device indicative of a selected sensor device for enrollment therewith and configuration thereof.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   detecting a plurality of signals received from a plurality of sensor devices;
   identifying a respective signal strength of each of the plurality of signals;
   receiving, at the mobile device, a first input selecting a first type of the plurality of sensor devices;
   displaying, on a mobile device receiving the plurality of signals, a first list of the plurality of sensor devices that have a respective identity type that matches the first type of the plurality of sensor devices selected by the first input alongside a second list of the respective signal strength of each of the plurality of signals received from each of the plurality of sensor devices that have the respective identity type that matches the first type of the plurality of sensor devices selected by the first input;
   receiving, at the mobile device, a second input selecting at least one of the plurality of sensor devices from the first list of the plurality of sensor devices; and
   transmitting, from the mobile device to a control panel, an identifying signal that identifies the at least one of the plurality of sensor devices selected by the second input to enroll the at least one of the plurality of sensor devices with the control panel device for configuration of the at least one of the plurality of sensor devices by the control panel device.

2. The method of claim 1 wherein detecting the plurality of signals includes a transceiver device connected to the mobile device receiving the plurality of signals.

3. The method of claim 2 wherein each of the plurality of signals includes a respective RF signal and each of the plurality of sensor devices includes a respective RF sensor device.

4. The method of claim 1 wherein detecting the plurality of signals includes a transceiver device built into the mobile device receiving the plurality of signals.

5. The method of claim 4 wherein each of the plurality of signals includes a respective Bluetooth signal and each of the plurality of sensor devices includes a respective Bluetooth sensor device.

6. The method of claim 4 wherein each of the plurality of signals includes a respective Wi-Fi signal and each of the plurality of sensor devices includes a respective Wi-Fi sensor device.

7. The method of claim 1 wherein displaying the first list of the plurality of sensor devices alongside the second list of the respective signal strength of each of the plurality of signals received from each of the plurality of sensor devices includes displaying the first list of the plurality of sensor devices alongside the second list of the respective signal strength of each of the plurality of signals received from each of the plurality of sensor devices on a user interface device of the mobile device.

8. The method of claim 1 wherein receiving the first and second input includes receiving the first and second input via a user interface device of the mobile device.

9. A method comprising:
   detecting a plurality of signals received from a plurality of sensor devices at a mobile device;
   identifying a respective signal strength of each of the plurality of signals;
   transmitting an identifying signal from the mobile device to a control panel device;
   the control panel device receiving, via a user interface device of the control panel device, a first input selecting a first type of the plurality of sensor devices;
   the control panel device displaying, on the user interface device of the control panel device, a first list of the plurality of sensor devices that have a respective identity type that matches the first type of the plurality of sensor devices selected by the first input alongside a second list of the respective signal strength of each of the plurality of signals received from each of the plurality of sensor devices that have the respective identity type that matches the first type of the plurality of sensor devices selected by the first input;
   the control panel device receiving, via the user interface device of the control panel device, a second input selecting at least one of the plurality of sensor devices from the first list of the plurality of sensor devices; and
   the control panel device enrolling the at least one of the plurality of sensor devices selected by the second input for configuration of the at least one of the plurality of sensor devices selected by the second input,
   wherein the identifying signal is indicative of each of the plurality of sensor devices and the respective signal strength of each of the plurality of signals received from each of the plurality of sensor devices.

10. The method of claim 9 wherein detecting the plurality of signals includes a transceiver device connected to the mobile device receiving the plurality of signals.

11. The method of claim 10 wherein each of the plurality of signals includes a respective RF signal and each of the plurality of sensor devices includes a respective RF sensor device.

12. The method of claim 9 wherein detecting the plurality of signals includes a transceiver device built into the mobile device receiving the plurality of signals.

13. The method of claim 12 wherein each of the plurality of signals includes a respective Bluetooth signal and each of the plurality of sensor devices includes a respective Bluetooth sensor device.

14. The method of claim 12 wherein each of the plurality of signals includes a respective Wi-Fi signal and each of the plurality of sensor devices includes a respective Wi-Fi sensor device.

15. A system comprising:
a transceiver device;
a user interface device;
a programmable processor; and
executable control software stored on a non-transitory computer readable medium,
wherein the transceiver device detects a plurality of signals received from a plurality of sensor devices;
wherein the programmable processor and the executable control software identify a respective signal strength of each of the plurality of signals,
wherein the user interface device receives a first input selecting a first type of the plurality of sensor devices,
wherein the user interface device displays a first list of the plurality of sensor devices that have a respective identity type that matches the first type of the plurality of sensor devices selected by the first input alongside a second list of the respective signal strength of each of the plurality of signals received from each of the plurality of sensor devices that have the respective identity type that matches the first type of the plurality of sensor devices selected by the first input,
wherein the user interface device receives a second input selecting at least one of the plurality of sensor devices from the first list of the plurality of sensor devices, and
wherein the transceiver device transmits, to a control panel device, an identifying signal that identifies the at least one of the plurality of sensor devices selected by the second input to enroll the at least one of the plurality of sensor devices with the control panel device for configuration of the at least one of the plurality of sensor devices by the control panel device.

16. The system of claim 15 wherein the transceiver device includes at least one of an RF transceiver, a Bluetooth transceiver, or a Wi-Fi transceiver.

17. The system of claim 15 wherein the user interface device is part of a mobile device.

18. The system of claim 15 wherein the user interface device is part of the control panel device.

* * * * *